United States Patent [19]
Lutz et al.

[11] Patent Number: 5,708,091
[45] Date of Patent: Jan. 13, 1998

[54] MULTIFUNCTIONAL INITIATOR FOR OBTAINING STAR-SHAPED POLYMERS BY AN ANIONIC ROUTE, PROCESS FOR ITS MANUFACTURE AND CORRESPONDING STAR-SHAPED POLYMERS, PROCESS FOR THEIR MANUFACTURE AND THEIR APPLICATIONS

[75] Inventors: Pierre Lutz, Bischeim; Paul Rempp, Strasbourg, both of France; David Rein, Providence, R.I.; Philippe Heim, Pau, France; Pascal Nicol, Pau, France; Bruno Vuillemin, Pau, France

[73] Assignee: Elf Atochem S.A., Puteaux, France

[21] Appl. No.: 798,475

[22] Filed: Feb. 10, 1997

Related U.S. Application Data

[62] Division of Ser. No. 519,616, Aug. 25, 1995, Pat. No. 5,633,323.

[30] Foreign Application Priority Data

Aug. 25, 1994 [FR] France .................. 94 10287

[51] Int. Cl.$^6$ .................. C08F 297/02; C08F 4/46
[52] U.S. Cl. .................. 525/271; 525/250; 525/314
[58] Field of Search .................. 525/314, 271, 525/250

[56] References Cited

U.S. PATENT DOCUMENTS

| | | | |
|---|---|---|---|
| 3,787,510 | 1/1974 | Farrar | 526/173 |
| 4,010,226 | 3/1977 | Crossland et al. | 525/271 |
| 4,678,837 | 7/1987 | Mancinelli | 525/250 |
| 5,247,026 | 9/1993 | Erikson et al. | 525/331.9 |

FOREIGN PATENT DOCUMENTS 288761  11/1988  European Pat. Off.

OTHER PUBLICATIONS

Tsitsilianis et al., *Core–First Synthesis of Star Polymers with Potentially Ionogenic Branches*, 24 Macromolecules 5897 (1991).

*Primary Examiner*—Irina S. Zemel
*Attorney, Agent, or Firm*—Burns, Doane, Swecker & Mathis, L.L.P.

[57] ABSTRACT

A multifunctional anionic polymerization initiator which is in the form of a star-shaped polymer, and which is soluble in a nonpolar medium and is substantially free of residual double bonds. The initiator is denoted by the general formula $(PA)_a N^{n-} nLi^+$. PA is a polymer block of a vinylaromatic or diene monomer A. The variable "a" is the number of branches in the block PA. N is a crosslinked core comprising no or practically no residual double bonds and has the formula $(PMc)(RLi)_p$. Mc is a monomer containing at least two polymerizable double bonds per molecule. PMc is a crosslinked core of at least one polymerized monomer Mc, containing 3 to 30% of residual double bonds in relation to the initial double bonds originating from the monomer Mc. R is an alkyl, aryl, arylalkyl, alkylaryl, cycloalkyl, or alkenyl. The variable "p" is the number of residual double bonds in PMc which are neutralized by RLi. The variable "n" is the number of anionic sites present in the crosslinked core N. A process of making and using the initiator to prepare star-shaped polymers.

12 Claims, No Drawings

MULTIFUNCTIONAL INITIATOR FOR OBTAINING STAR-SHAPED POLYMERS BY AN ANIONIC ROUTE, PROCESS FOR ITS MANUFACTURE AND CORRESPONDING STAR-SHAPED POLYMERS, PROCESS FOR THEIR MANUFACTURE AND THEIR APPLICATIONS

This application is a divisional of application No. 08/519,616, filed on Aug. 25, 1995 now U.S. Pat. No. 5,633,323.

BACKGROUND OF THE INVENTION

FIELD OF THE INVENTION

The invention relates to a multifunctional initiator for anionic polymerization.

The initiator corresponds to the formula $(PA)_a N^{n-} nLi^+$ where PA is a polymer block of a vinylaromatic or diene monomer A, where a is the number of branches in the block PA, where N is a crosslinked core no longer or practically no longer containing any residual double bonds, which has the formula $(PMc)(RLi)_p$ in which Mc is a monomer containing at least two polymerizable double bonds per molecule, PMc is a crosslinked core of at least one polymerized monomer Mc, containing 3 to 30% of residual double bonds in relation to the initial double bonds originating from the monomer Mc, R is an alkyl, aryl, arylalkyl, alkylaryl, cycloalkyl or alkenyl radical, p is the number of residual double bonds of PMc which are neutralized by RLi and n is the total number of anionic sites present in the crosslinked core N.

SUMMARY OF THE INVENTION

The present invention relates to a new multifunctional initiator in the form of a star-shaped polymer, soluble in an apolar medium and resulting in the synthesis, by anionic route, of well defined star-shaped polymers, especially of star-shaped polymers comprising first-generation arms made of vinylaromatic or diene polymer blocks, and second-generation arms made up of vinylaromatic or diene polymer blocks or else of two homopolymer blocks, one, joined to the core, being of diene or vinylaromatic type and the other, joined to the preceding one and different from it, being of vinylaromatic or (meth) acrylic or vinylpyridine type, it being possible for the end groups or the end blocks to be also functionalizing groups.

Star-shaped copolymers with elastomer and thermoplastic branches are thus obtained, it being possible furthermore for the elastomer and thermoplastic blocks to exist in the same arm. Such copolymers have a good heat resistance and are useful as pressure-sensitive adhesives and as agents improving the impact strength and the heat resistance of polymers. As examples of these copolymers it is possible to mention those with cis-poly-1,4-butadiene or polyisoprene blocks, which are good elastomers, and with poly(meth) acrylic end blocks. Such copolymers generally cannot be obtained by a sequential route; in fact, a living poly(methyl methacrylate) block cannot initiate a polybutadiene block.

The invention also relates to the process for the manufacture of the abovementioned multifunctional initiators and to the star-shaped polymers which they make it possible to obtain and to the manufacture of the latter and their applications.

With regard to the anionic synthesis of star-shaped macromolecules, three methods have been developed so far, each of which has specific advantages and disadvantages:

(A) In the "arm-first" method a living precursor polymer (polystyrene, polydiene) is prepared and is used to initiate the polymerization of a small quantity of a diunsaturated monomer, especially divinylbenzene. Small cores of polydivinylbenzene are then formed, surrounded and protected by the precursor chains which have contributed to their initiation. This method produces well defined star-shaped macromolecules, of moderate polydispersity, but it prohibits the functionalization of the arms at their outer end. It can be carried out in polar (tetrahydrofuran) or apolar (benzene, cyclohexane) medium and can therefore be applied to the polydienes, in the case of which the control of the cis/trans 1,4 microstructure involves the use of an apolar medium.

Although this method has been known and applied for a long time, the kinetics of formation of the stars and the proportion of residual double bonds (not affected by the polymerization) in the polydivinylbenzene cores still remained to be clarified, among other things. The present inventors have conducted experiments which have made it possible to reveal the gradual and not immediate formation of the cores and to follow the development of their functionality and the presence of residual unsaturations in these cores, especially in the case of the styrene-divinylbenzene system in a benzene or cyclohexane medium.

Another series of experiments has been concerned with the "arm-first" formation of polybutadiene or polyisoprene stars. The initiation of the polymerization of divinylbenzene by butadienyl or isoprenyl sites is slow, and this has two important consequences: on one hand, a high proportion of linear polybutadiene or polyisoprene remains, even after very long reaction times and, on the other hand, the cores are very large and of high functionality. From this investigation it follows that the "arm-first" method does not lend itself well to the synthesis of polydiene stars free from residual homopolymer.

(B) The "core-first" method consists in preparing a multifunctional organometallic initiator and in employing it for the initiation of a monomer (styrene, dienes, vinylpyridine, (meth)acrylic esters) the polymerization of which will form the arms. The difficulty lies in obtaining homogeneous solutions of multifunctional cores. The procedure followed is the anionic polymerization of divinylbenzene at high dilution, the divinylbenzene/initiator molar ratio being chosen within narrow limits. The disadvantage of this method is the very high mass- and functionality-polydispersity of these samples of star-shaped polymer; its advantage is that it allows the functionalization of the arms at their end and the synthesis of stars with block arms.

While the "core-first" method yields satisfactory results with styrene in polar medium, the present inventors have been able to show, during preliminary tests performed on isoprene, that this method is difficult to use with dishes in apolar medium, this being for two reasons:

the physical associations between active sites, in apolar medium, result in the solidification of the reaction medium at an early stage of the polymerization, making stirring virtually impossible in a medium;

if the initiator cores contain residual double bonds (which is demonstrated by the results described above), chemical bridges can also form, thus resulting in the formation of a polymer network.

(C) The "double star" method of synthesis of macromolecules takes place in three stages ("in-out" method). Advantage is taken of the fact that, during the "arm-first" synthesis, each core contains a number of organometallic sites which is equal to the number of arms which surround it. These sites can subsequently serve for the initiation of the polymerization of a second monomer, which results in the formation of a second generation of arms.

The second-generation arms thus formed carry an active end site and can therefore be functionalized at a chain end. Their average length is given by the molar ratio monomer/active sites, and their number is substantially equal to that of the first-generation arms. The latter are preferably chosen to be short, so that the second-generation arms constitute the main part of the polymer material.

This method has been successfully applied to the synthesis of double stars of polystyrene-polyoxyethylene, polystyrene-poly(methyl methacrylate), polystyrene-poly (tert-butyl acrylate) and polystyrene-polyvinylpyridine, the first-generation polystyrene arms being in most cases of low mass if they are intended exclusively to ensure the protection of the polydivinylbenzene cores which contain the active (polyfunctional initiator) sites.

The unsaturations which could continue to exist within the cores of the polystyrene "primary" stars do not interfere with the synthesis of the double stars to which reference has just been made. On the other hand, if the second-generation arms result from the polymerization of weakly electrophilic monomers, these double bonds are responsible for the formation of intermolecular bridges. This is the case with styrene and, in general, with vinylaromatic monomers end dienes. Various attempts at synthesis, using the "in-out" method, of double stars whose second-generation arms are made of polystyrene, polyisoprene or polybutadiene, have, however, ended in failure because of the chemical crosslinking which is seen as the irreversible solidification of the reaction mixture. This bridging is attributable to the reaction of a growing active site, situated at the end of an arm, with a residual double bond belonging to the core of another molecule.

It has therefore been found advantageous to investigate processes for forming double stars whose second-generation arms would include vinylaromatic and/or polydiene polymer blocks.

The present inventors have concentrated on the problems linked with the insolubility of the multifunctional initiators in apolar medium and with the chemical crosslinking which can take place when a living crosslinked core is employed as multifunctional initiator. They have first of all studied the kinetics of formation of the polystyrene "primary" stars in apolar medium and devoted themselves to measuring the proportion of residual double bonds in the cores, as a function of the reaction time. The presence of residual unsaturations has been confirmed, even after very long reaction periods, corresponding to the final value of the molecular mass of the primary star.

DETAILED DESCRIPTION OF THE PREFERRED EMBODIMENTS

The subject of the present invention is therefore first of all a multifunctional initiator of anionic polymerization existing in the form of a star-shaped polymer, soluble in apolar medium, no longer or practically no longer containing any residual double bonds, denoted by the general formula (I):

$$(PA)_a N^{n-} nLi^+ \quad (I)$$

in which:

PA denotes a polymer block originating from at least one monomer A chosen from vinylaromatic or diene monomers;

a denotes the number of arms of the PA block and is between 3 and 15;

N denotes a crosslinked core no longer or practically no longer containing any residual double bonds, which has the formula:

$$(PMc)(RLi)_p$$

in which:

Mc is a monomer containing at least two polymerizable double bonds per molecule;

PMc is a crosslinked core of at least one polymerized monomer Mc, containing 3 to 30% of residual double bonds in relation to the initial double bonds originating from the monomer Mc;

R is an alkyl radical with a linear or branched chain containing 1 to 6 carbon atoms, an aryl radical with one or a number of ring(s), an arylalkyl or alkylaryl radical in which the alkyl group has from 1 to 6 carbon atoms, a cycloalkyl radical and a $C_2$–$C_6$ alkenyl radical substituted by an aryl or alkylaryl group;

p is the number of anionic sites resulting from the neutralization of the residual double bonds in PMc by RLi;

n is the total number of anionic sites present in the crosslinked core N; n is equal to a'+p (or to p), p having the above meaning and a' being the number of anionic sites present in the crosslinked PMc core and corresponding to the number of arms of the block PA.

Depending on the meaning of n, the multifunctional initiator may have the formula (Ia) or (Ib):

$$(PA)_a[PMc(RLi)_p]^{(a'+p)-}, (a'+p)Li^+ \quad (Ia)$$

$$(PA)_a[PMc(RLi)_p]^{p-}, pLi^+ \quad (Ib)$$

The "vinylaromatic" monomer, as employed in the present description, means an aromatic monomer containing ethylenic unsaturation. Nonlimiting examples are styrene, vinyltoluene, alpha-methylstyrene, 4-methylstyrene, 3-methylstyrene, 4-methoxystyrene, 4-ethylstyrene, 4-ethoxystyrene, 3,4-dimethylstyrene, 3- tert-butylstyrene, 1-vinylnaphthalene and 2-vinylnaphthalene. The preferred monomer is styrene.

The expression "diene monomer" as employed in the present description refers to a diene chosen from linear or cyclic conjugated dienes containing from 1 to 20 carbon atoms. Nonlimiting examples include butadiene, isoprene, 1,3-pentadiene, cyclopentadiene, piperylene and phenylbutadiene, The preferred monomers are butadiene and isoprene.

As for the multiunsaturated monomer Mc, this can be chosen especially from polyvinylbenzenes such as divinylbenzene or trivinylbenzene and diisopropenylbenzenes. A preferred monomer Mc is divinylbenzene.

RLi may be sec-butyllithium, n-butyllithium and alpha-methylstyryllithium, 1,1-diphenylhexyllithium, diphenylmethyllithium and 1,1-diphenyl-3-methylpentyllithium.

The weight-average molecular mass of a PA arm is approximately 500 to 200,000 or more, preferably approximately 1000 to 10,000. The number-average molecular mass of the multifunctional initiator of formula (I) is especially approximately 2500 to 500,000 or more, in particular approximately 5000 to 10,000.

The multifunctional initiator is especially in the dissolved state in apolar medium. Toluene, benzene and ethylbenzene are mentioned especially as an apolar solvent. A mixture of these solvents can also be employed. These solvents cab be used pure or also may be used in combination with cyclohexane, hexane, heptane, these latter compounds being preferably used in minor quantities.

Another subject of the present invention is a process for the preparation of the multifunctional initiator as defined above. This process is characterized by the fact that:

(A) in a first stage an anionic polymerization of at least one monomer (A) is conducted in apolar medium with the aid of an initiating system which comprises:

a) at least one monofunctional initiator of formula (II):

$$R^1-M \quad \quad (II)$$

in which:

M denotes an alkali or alkaline-earth metal, and $R^1$ denotes an alkyl radical with a linear or branched chain containing 1 to 6 carbon atoms, an aryl radical with one or a number of optionally substituted ring(s), an arylalkyl or alkylaryl radical in which the alkyl group has from 1 to 6 carbon atoms, a cycloalkyl radical and a $C_2$–$C_6$ alkenyl radical substituted by an aryl or alkylaryl group, b) if appropriate, at least one ligand chosen from the inorganic salts of alkali metals, nonnitrogenous macrocyclic complexing agents and organic compounds of alkali metals in which the alkali metal is associated with a group of formula $B(R^2)_4$ where $R^2$ is chosen from the hydrogen atom and the alkyl and aryl radicals, which makes it possible to obtain a living active site at the end of the polymer block PA⁻;

(B) in a second stage the living block PA⁻ is reacted, in the medium which has been used to conduct its polymerization by anionic route, with at least one monomer Mc in a molar ratio of 2.5–15 per active centre, which makes it possible to obtain a star-shaped living polymer of formula (III):

$$(PA)_a(PMc)^{a-}, aLi^+ \quad \quad (III)$$

(C) in a third stage, either (C1) the star-shaped polymer precursor of formula (III): $(PA)_a(PMc)^{a-}$, $aLi^+$ is reacted with a quantity of a compound of formula RLi as defined above, capable of consuming the residual double bonds of the core of the said living polymer (III), which makes it possible to obtain the expected multifunctional initiator of formula (Ia):

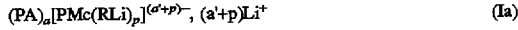

$$(PA)_a[PMc(RLi)_p]^{(a+p)-}, (a'+p)Li^+ \quad \quad (Ia)$$

or (C2) the active sites of the star-shaped polymer of formula (III): $(PA)_a(PMc)^{a-}$, $aLi^+$ are deactivated by a reaction with a source of protons consisting especially of an alcohol, water or a protonic acid, which, after separation, makes it possible to obtain the star-shaped precursor polymer in the deactivated state of formula (IV):

$$(PA)_a(PMc) \quad \quad (IV)$$

and (D) in a fourth stage, conducted in the case where the operation (C2) has been performed in the third stage, the deactivated precursor polymer of formula (IV): $(PA)_a(PMc)$ is reactivated by reaction with RLi as defined above, so as to re-form active sites at the expense of the residual double bonds of the core of the said polymer (IV): $(PA)_a(PMc)$, which makes it possible to obtain the expected multifunctional initiator $(PA)_a[PMc (RLi)_p]^{p-}$, $pLi^+$.

The monofunctional initiating agents of formula (II) employed in the first stage are, for example, sec-butyllithium, n-butyllithium and alpha-methylstyryllithium, 1,1-diphenylhexyllithium, diphenylmethyllithium and 1,1-diphenyl-3-methylpentyllithium. In particular, sec-butyllithium, n-butyllithium and alpha-methylstyryllithium are chosen as the initiator (II).

The ligand may be chosen first of all from the inorganic salts of alkali or alkaline-earth metals, for example the chlorides, fluorides, bromides, iodides, borides, sulphates, nitrates and borates.

The ligand may also consist of a nonnitrogenous macrocyclic complexing agent chosen especially from the cyclic polyethers (also called crown ethers), such as macrocyclic polyethers whose macrocyclic ring contains at least 14 carbon and oxygen atoms, each oxygen atom in the ring being separated from the other oxygen atoms in the ring by two carbon atoms; such macrocyclic polyethers have already been described in U.S. Pat. Nos. 3,687,978 and 4,826,941.

The ligand may also be an alkali metal alcoholate of formula $R^3(OR^4)_mOM_a$ or $M_a(OR^4)_mOM_a$, where:

$M_a$ denotes an alkali metal;

$R^3$ is a linear or branched alkyl radical containing from 1 to 6 carbon atoms or an arylalkyl radical in which the alkyl residue is $C_1$–$C_6$, or an alkylaryl radical in which the alkyl group has from 1 to 6 carbon atoms;

$R^4$ is a linear or branched alkylene radical containing from 2 to 4 carbon atoms;

m has the value 0 or is the integer 1, 2 or 3.

As examples of these alkali metal alcoholates it is possible to mention the alcoholates of the above formulae, in which:

$R^3$ denotes methyl, ethyl, butyl and benzyl;

$R^4$ denotes ethylene, (propylene, butylene and isopropylene); and $M_a$ is lithium, sodium or potassium.

The ligand may also be an organic compound of an alkali metal, in which the latter is associated with a group $B(R^2)_4$, like the borohydride group and the tetraphenylboride group.

In the above process according to the invention, in stage (A), the proportion of ligand employed may vary greatly in relation to the initiator $R^1$—M. This quantity may be, for example, in a large excess in relation to the molar quantity of initiating agent. This quantity may also be equal to or lower than the molar quantity of initiating agent.

The ligand is introduced in a molar proportion to the initiator which is at least 0 and ranges up to approximately 50, preferably from 1 to 10.

Furthermore, in accordance with this process, in stage (C1) or (D), the compound RLi is reacted especially in a proportion of approximately 0.7 to 2 equivalents relative to the residual double bonds. It is advisable to evaluate carefully the quantity of compound RLi to be added. If it is insufficient, chemical bridging is still to be feared; in the contrary case the excess of compound RLi will subsequently, during the synthesis of the double stars, result in the formation of linear homopolymer besides the double stars which are the aim.

The above process is furthermore conducted at a temperature which is generally between 20° and 100° C.

According to the invention, a method intended to eliminate these unsaturations, without affecting the stars themselves or the active sites which they contain, has been developed. In fact, the addition of compounds of RLi type, for example sec-butyllithium, to the solution of living stars of vinylaromatic (polystyrene) or diene polymer makes it possible to reduce, in high proportions, the number of residual unsaturations in the cores without, however, resulting in bridging. The synthesis of double stars whose second-generation arms would consist of vinylaromatic polymer or polydiene is thus made possible.

The solution provided according to the invention consists in employing a vinylaromatic or diene polymer, generally of low molecular mass, with a view to the formation of the crosslinked core, which enables the initiator to remain soluble in apolar medium and prevents the bridging between cores, bridging due to the attack on the residual double bonds of the core by growing anionic sites. The addition of a compound RLi, after the formation of the core, results in the residual double bonds being consumed.

To test the effectiveness of this method of saturation of the residual double bonds by a compound RLi, the present inventors have carried out "in-out" experiments intended for the synthesis of "double star-shaped" molecules in which the second-generation arms are made of polystrene, polyisoprene and polybutadiene respectively. In all cases the chemical crosslinking—resulting in an irreversible gelling—has been successfully avoided; the effectiveness of the process is demonstrated by the comparison of the molecular mass of the stars formed with that of the polystyrene stars which had been used as multifunctional initiators. These results bear witness to the absence of any intemolecular coupling.

A further subject of the present invention is a star-shaped polymer denoted by the formula (V):

or the formula (Va):

depending on whether it is in the living state or the deactivated state respectively, in which formulae:

PA has the same meaning as that given above, a is as defined above,

PB denotes a polymer block originating from at least one monomer B chosen from vinylaromatic monomers and diene monomers, PB denoting a block of the second-generation polymer arm, PC, optionally present, denotes a polymer block originating from at least one monomer C, other than B, chosen from the vinylaromatic or (meth)acrylic monomers and vinylpyridine, and r is the number of [PB—PC] arms, being included between 3 and 30.

The vinylaromatic and diene monomers are as defined above.

The term "(meth)acrylic monomer", as employed in the present description, means a monomer chosen from the (meth)acrylates of formula, respectively:

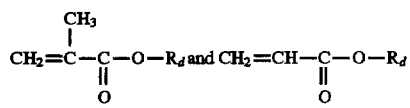

in which $R_d$ is chosen from primary, secondary or tertiary, linear or branched, $C_1$–$C_{18}$ alkyl, $C_5$–$C_{18}$ cycloalkyl, ($C_1$–$C_{18}$ alkoxy)—$C_1$–$C_{18}$ alkyl, ($C_1$–$C_{18}$ alkylthio)—$C_1$–$C_{18}$ alkyl, aryl and arylalkyl radicals, these radicals being optionally substituted by at least one halogen atom and/or at least one hydroxyl group, after protection of this hydroxyl group, the above alkyl groups being linear or branched, glycidyl, norbornyl and isonorbornyl (meth)acrylates and N,N-di($C_1$–$C_{18}$ alkyl) (meth)acrylamides.

As examples of methacrylates of the above formula it is possible to mention methyl, ethyl, 2,2,2-trifluoroethyl, n-propyl, isopropyl, n-butyl, sec-butyl, tert-butyl, n-amyl, i-amyl, n-hexyl, 2-ethylhexyl, cyclohexyl, octyl, i-octyl, nonyl, decyl, lauryl, stearyl, phenyl and benzyl methacrylates. The preferred methacrylic monomer is methyl methacrylate.

As examples of acrylates of the above formula it is possible to mention methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl acrylates.

Both the block PB and the block PC generally have a weight-average molecular mass of 1000 to 50,000 each.

This star-shaped polymer has a weight-average molecular mass which is generally between 10,000 end 2,000,000, in particular between 20,000 and 1,000,000.

It is possible to mention very particularly a star-shaped polymer as defined above, in which the block PB is a cis-poly-1,4-butadiene or polyisoprene block, and the block PC, optionally present, is a poly(acrylic ester) or poly (methacrylic ester) block.

Another subject of the present invention is a process for the manufacture of a star-shaped polymer as defined above, characterized in that an anionic polymerization of at least one monomer B, as defined above, is conducted with the aid of a multifunctional initiator system of formula (I): $(PA)_a N^{n-} nLi^+$ and, if appropriate, at least one ligand chosen from those indicated above, the said polymerization being conducted in the apolar medium which has been used to obtain the said multifunctional initiator, which makes it possible to obtain a star-shaped living polymer with second-generation arms, and, if appropriate, the said star-shaped living polymer thus obtained is reacted with at least one monomer C, if appropriate in the presence of a ligand as defined above, which makes it possible to obtain a star-shaped living polymer with PB—PC arms, PC being the end blocks and, to obtain the expected star-shaped polymer in the deactivated state, the end active sites of the arms are deactivated by a reaction with a source of protons consisting especially of an alcohol, water or a protonic acid, and if appropriate, a transesterification or a hydrolysis in acidic medium of the star-shaped copolymer obtained is conducted.

The polymerization temperature of a conjugated diene or of a vinylaromatic monomer may vary between 0° C. and 100° C. and, preferably, between 0° C. and 70° C. That of the polymerization of a (meth) acrylic monomer varies between −50° C. and +60° C. and is preferably situated between −30° C. and +20° C.

The polymerization period of a conjugated diene or of a vinylaromatic monomer depends on the temperature and on the initial monomer and initiator concentrations and can vary, for example, between 0.5 and 24 hours and, preferably, between 0.5 and 5 hours. That of the polymerization of the (meth)acrylic monomer is very short and can vary, for example, between 1 second and 1 hour, preferably between 5 seconds and 15 minutes.

The protonic compound added at the end of polymerization to deactivate the active sites of the polymer may be chosen especially from water, alcohols and acids. Acidified methanol is used in particular.

The residual unsaturation of the polydiene blocks may be subsequently at least partially reduced by usual hydrogenation techniques in order to improve its properties, especially the stability to ultraviolet light.

To isolate the copolymer, it may be precipitated from its solution into excess methanol and may be vacuum-dried at ambient temperature. It is then obtained in the form of grains or powder.

The star-shaped copolymers obtained by the process according to the invention are thermoplastic elastomers and can be treated by processes usually employed for thermoformable materials, for example extrusion or injection moulding, to obtain articles such as fibres, coatings and shoes. They can also form functional gels and pressure-sensitive adhesives. They can also be employed as rheology modifiers and as agents capable of improving the impact strength of various other polymers such as polymethyl methacrylate, polystyrene, poly(vinylchloride) and polycarbonate. They can also be used in combination with reinforcing agents and plasticizers, stabilizers, colorants and fillers.

All these products are particularly advantageous, especially for their good heat resistance, which makes them suitable for any use before they are subjected to elevated temperatures.

EXAMPLES

The following examples illustrate the invention, no limitation being implied.

The following abbreviations have been employed in these examples:

secBuLi=sec-butyllithium
DVB=divinylbenzene
MeOH=methanol
PS=polystyrene polymer block
PBD=cis-poly-1,4-butadiene polymer block
PI=polyisoprene polymer block
PMMA=poly(methyl methacrylate) polymer block.

In the polymers of the present invention all these blocks are arranged as arms of stars:

PS.DVB=PS star, precursor of multifunctional initiator (star-shaped polymer with first-generation arms)

PS.DVB.secBuLi=multifunctional initiator originating from PS.DVB.

All the polymers below are star-shaped polymers containing first-generation PS arms and originate from the star-shaped initiator referred to above.

PS—PS=PS double star (star-shaped polymer with first- and second-generation PS arms);

PS—PBD=PS—PBD double star (star-shaped polymer with second-generation PBD arms);

PS—PI=PS—PI double star (star-shaped polymer with second-generation PI arms).

The weight-average molecular masses $M_w$ were obtained by the light-scattering method.

The proportions of residual unsaturations in the cores were obtained by UV spectroscopy at $\lambda$=295 nm.

Example 1

Synthesis of a living PS.DVB 300 g of benzene, purified beforehand, were injected into a reactor of 1-liter capacity which had undergone several vacuum/flaming/argon cycles.

The solution was then brought to 7° C. and 10 g of styrene were added. A few drops of secBuLi were then injected until a yellow colour appeared, to remove any trace of protic impurities, and then the quantity of secBuLi (1.4.ml of a 0.65M solution). calculated to obtain the desired mass of the PS arm. Reaction was then allowed to proceed for 30 min at 50° C. A sample was then taken to characterize the PS arm thus formed.

Measured $M_w$ of the PS arm=10,600

Theoretical $M_w$=10,900

0.75 ml of DVB was then added with strong stirring and the reaction mixture was allowed to react for 1 hour at 30° C. A sample was then taken to characterize the PS.DVB thus formed.

$M_w$ of PS.DVB=105,000

% of residual double bonds≈7

Examples 2 to 4

Synthesis of Three Living PS.DVBs

The procedure was as in Example 1, to obtain first of all the PS arms of $M_w$ of 500, 1000 and 22,300 (Examples 2, 3, 4 respectively).

Continuing to proceed as in Example 1, the resulting solutions were reacted with DVB. The results, given in Table I below, show that, whatever the reaction period with DVB, residual double bonds (shown as/μ) remain.

TABLE I

| Example 2 | | | Example 3 | | | Example 4 | | |
|---|---|---|---|---|---|---|---|---|
| DVB reaction period (min) | $M_w$ of PS · DVB | % of /\\ | DVB reaction period (min) | $M_w$ of PS · DVB | % of /\\ | DVB reaction period (min) | $M_w$ of PS · DVB | % of /\\ |
| 30 | 3700 | 10.8 | 20 | 91200 | 14.0 | 30 | 132000 | 9.8 |
| 60 | 42000 | 9.9 | 60 | 114000 | 12.0 | 60 | 143000 | 8.5 |
| 80 | 49000 | 7.3 | 240 | 142000 | 9.6 | 180 | 170000 | 8.5 |
| 1000 | 53000 | 6.0 | 1000 | 160000 | 9.6 | 1080 | 210000 | 8.0 |

Examples 5 to 9

Synthesis of Five Living PS.DVBs

The procedure was as in Example 1 in order to synthesize five living PS.DVBs with a variable number of arms and arm length. The results are given in Table II below.

TABLE II

| Example | $M_w$ of the PS arm | % by weight of DVB | $M_w$ of star PS·DVB | Average number of PS arms | Mass % of linear chains at the end |
|---|---|---|---|---|---|
| 5 | 4700 | 21.0 | 154000 | 26 | 3 |
| 6 | 4500 | 8.5 | 52700 | 10 | 6 |
| 7 | 10100 | 11.0 | 160000 | 14 | 5 |
| 8 | 22300 | 8.0 | 210000 | 9 | 8 |
| 9 | 14300 | 7.7 | 114000 | 8 | 9 |

Example 10 (Comparative)

Use of a living PS.DVB as such in the synthesis of a star-shaped polymer with styrene as monomer for the second-generation arms The living PS.DVB polymer of Example 1 was employed as multifunctional initiator of anionic polymerization. For this purpose 20 ml of styrene at 40°–50° C. were added to the solution as obtained in Example 1. An irreversible gel was then formed, which was due to a chemical crosslinking of the system.

Example 11

Synthesis of a PS—PS

1. Preparation of PS-DVB-secBuLi from the living PS.DVB of Example 1 1.5 ml of secBuLi (0.65M) were added to the solution of living PS.DVB polymer obtained in Example 1, it being assumed that 12% of residual double bonds remained, and reaction was allowed to proceed for 2 hours at 50° C.
2. Synthesis of the PS—PS 20 ml of styrene were added to the solution prepared above and reaction was allowed to proceed at 40°–50° C. for 2 hours.

The polymerization was stopped by adding MeOH; no chemical crosslinking was observed. The final polymer was then isolated by precipitation into MeOH.

Characteristics of the polymer formed: this polymer consists of 40% by weight of PS—PS ($M_w$=220,000) and 60% by weight of a linear styrene homopolymer ($M_w$=65,000). The presence of the homopolymer is due to the presence of sec-BuLi in slight excess in relation to the residual double bonds.

Example 12

Synthesis of a PS—PI

1. Preparation of the living PS.DVB 200 ml of benzene, purified beforehand were injected into a reactor of 1-liter capacity which had been subjected to several vacuum/flaming/argon cycles. The solution was then brought to 7° C. and 7.7 ml of styrene were added. A few drops of secBuLi were then added until a yellow colour appeared, to remove any trace of protic impurities, and then the quantity of secBuLi (1.9 ml of a 0.353M solution) calculated to obtain the desired mass of the PS arm. The reaction was then allowed to proceed for 1.25 hours at 50° C. A sample was then taken to characterize the PS arm thus formed. $M_w$ of the PS arm=6,700 2.3 ml of DVB were then added to the solution obtained with strong stirring, and the reaction mixture was allowed to react for 1 hour at 35° C. A sample was then taken to characterize the PS.DVB thus formed: $M_w$ of PS.DVB=211,500 % of residual bonds=6
2. Preparation of PS.DVB.secBuLi 2.6 ml of secBuLi (0.353M) were added to the solution of living PS.DVB polymer obtained above, it being assumed that 7% of residual double bonds remained, and reaction was allowed to proceed for 35 minutes at 35° C.
3. Synthesis of the PS—PI 19 ml of isoprene were added to the above reaction solution and reaction was allowed to proceed for 2 hours at 45° C. The reaction mixture became very viscous because of the associations between active sites.

The polymerization was stopped by adding MeOH; the viscosity then dropped suddenly as a result of the break-up of the aggregates between active sites; no chemical crosslinking was observed and the final polymer was isolated by precipitation into MeOH. Characteristics of the polymer formed: this polymer consists of 58% of PS—PI and 42% of a linear isoprene homopolymer. The PS—PI polymer isolated by fractionation with the aid of the heptane/ethanol system has an $M_w$ of 425,000 and contains 58% by weight of PS and 42% by weight of PI.

Example 13

Synthesis of a PS—PBD

1. Preparation of the living PS.DVB 100 ml of benzene, purified beforehand, were injected into a reactor of 1-liter capacity, which had been subjected to several vacuum/flaming/argon cycles. The solution was then brought to 7° C. and 3.3 ml of styrene were added. A few drops of secBuLi were then injected until a yellow colour appeared, to remove any trace of protic impurities, and then the quantity of secBuLi (0.95 ml of a 0.63M solution) calculated eo obtain the desired mass of the PS arm. Reaction was then allowed to proceed for 30 minutes at 60° C. A sample was then taken to characterize the PS arm thus formed: $M_w$ of the PS arm=4,200 0.5 ml of DVB was then added with strong stirring and the reaction mixture was allowed to react for 1.5 hours at 35° C. A sample was then taken to characterize the PS.DVB thus formed. $M_w$ of PS.DVB=99,600 % of residual double bonds=12
2. Preparation of the PS.DVB.secBuLi 0.80 ml of secBuLi (0.63M) was added to the solution of living PS.DVB polymer obtained above, it being assumed that 14% of residual double bonds remained, and reaction was allowed to proceed for 15 minutes at 50° C.
3. Synthesis of the PS—PBD 8.1 g of butadiene were added to the solution prepared above and reaction was allowed to proceed for 16 hours at 40°–50° C. The reaction mixture became very viscous because of the associations between active sites. The polymerization was stopped by adding MeOH; no chemical crosslinking was observed. The final polymer was then isolated by precipitation into MeOH. Characteristics of the polymer formed: this polymer consists of 42% by weight of PS—PBD and 58% by weight of a linear butadiene homopolymer. The PS—PBD polymer isolated by fractionation with the aid of the heptane/ethanol system has an $M_w$ of 425,000 and contains 72% by weight of PBD and 28% by weight of PS.

Example 14

Preparation of a PS.DVB.secBuLi by Reactivation of a Deactivated PS.DVB

1. Obtaining the deactivated PS.DVB A living PS.DVB polymer was prepared in the same way as that described in Example 1. It was deactivated by addition of a very dilute solution of MeOH in benzene until the characteristic red colour of the active centres disappeared and was isolated by MeOH precipitation. $M_w$ of the PS arms=2,000 DVB/PS arm ratio=4
2. Obtaining the PS.DVB.secBuLi 2.5 g of this PS.DVB were dissolved in 150 ml of benzene. 0.6 ml of secBuLi (0.59M) was then added, being the quantity needed to attack the residual double bonds of PS.DVB (calculated quantity for reactivating the residual double bonds, which were estimated at 11%), which resulted in the formation of carbanionic sites, initiators of the anionic polymerization. Reaction was then allowed to proceed for 45 minutes at 35° C. The orange colour which appears is a sign of the reactivation of the molecule (creation of active sites).

Example 15

Preparation of a PS—PS from PS.DVB.secBuLi of Example 14

11.8 g of styrene were added to the initiator solution prepared according to Example 14 and reaction was allowed to proceed for 1.5 hours at 40° C. No chemical crosslinking was observed.
Results: Yield: 100%
Composition of the crude polymer: 70% by weight of PS—PS 30% by weight of linear PS homopolymer.

Example 16

Preparation of a PS—PI from a PS.DVB.secBuLi Prepared as in Example 14(2)

1. Preparation of the PS.DVB.secBuLi The procedure was as described in Example 14 (2), using 2.85 g of the PS.DVB according to Example 14 (1) and 1.7 ml of secBuLi (0.49M), with 40 minutes' reaction at 30° C.
2. Synthesis of the PS—PI The procedure was as in Example 15, but using 8.9 g of isoprene and a reaction period of 2.5 hours. No chemical crosslinking was observed. $M_w=700,000$
Results: Yield: 100%
Composition of the crude polymer: 40% by weight of PS—PI 60 % by weight of linear PI homopolymer.
PS/PI weight ratio of the polymer: 0.3

What is claimed is:

1. A process for the preparation of a multifunctional anionic polymerization initiator which is in the form of a star-shaped polymer and which is soluble in a nonpolar medium, said initiator being denoted by formula (I):

$$(PA)_a N^{a+} nLi^+ \quad (I)$$ 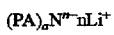

in which:

PA denotes a polymer block originating from at least one monomer A chosen from vinylaromatic or diene monomers;

a denotes the number of arms of the PA block and is between 3 and 15;

N denotes a crosslinked core substantially free of residual double bonds, which has formula:

$$(PMc) (RLi)_p$$ 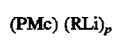

in which:

Mc is a monomer containing at least two polymerizable double bonds per molecule;

PMc is a core comprising a crosslinked polymerized monomer Mc, and containing 3 to 30% of residual double bonds in relation to the initial double bonds originating from the monomer Mc;

R is an alkyl radical with a linear or branched chain having 1 to 6 carbon atoms, an aryl radical with one or a number of ring(s), an arylalkyl or alkylaryl radical in which the alkyl group has from 1 to 6 carbon atoms, a cycloalkyl radical or a $C_2$–$C_6$ alkenyl radical substituted by an aryl or alkylaryl group; and p is the number of anionic sites resulting from the neutralization of the residual double bonds in PMc by RLi, and n is the number of anionic sites present in the crosslinked core N; n is equal to a'+p or to p, p having the above meaning and a' being the number of anionic sites present in the crosslinked PMc core and corresponding to the number a of arms of the PA block, said process comprising the steps of:

a) anionically polymerizing at least one monomer A in a nonpolar medium in the presence of an initiating system which comprises:

i) at least one monofunctional initiator of formula (II):

$$R^1—M \quad (II)$$ 

in which:

M denotes an alkali or alkaline-earth metal, and $R^1$ denotes an alkyl radical with a linear or branched chain having 1 to 6 carbon atoms, an aryl radical with one or a number of ring(s), an arylalkyl or alkylaryl radical in which the alkyl group has from 1 to 6 carbon atoms, a cycloalkyl radical or a $C_2$–$C_6$ alkenyl radical substituted by an aryl or alkylaryl group; and ii) optionally, at least one ligand selected from inorganic salts of alkali metals, nonnitrogenous macrocyclic complexing agents and organic compounds of alkali metals in which the alkali metal is associated with a group of formula $B(R^2)_4$ where $R^2$ is a hydrogen atom or an alkyl or aryl radical, to obtain a living polymer block PA$^-$ b) reacting the living block PA$^-$ with at least one monomer Mc in a molar ratio of 2.5 to 15 per active center to obtain a star-shaped living polymer of formula (III):

$$(PA)_a(PMc)^{a-}aLi^+ \quad (III)$$ 

c) reacting the star-shaped polymer of formula (III) with a compound of formula RLi as defined above to obtain a multifunctional initiator of formula (I).

2. The process according to claim 1, wherein the monofunctional initiator of formula (II) is sec-butyllithium, n-butyllithium and alpha-methylstyryllithium, 1,1-diphenylhexyllithium, diphenylmethyllithium or 1,1-diphenyl-3-methylpentyllithium.

3. The process according to claim 1, wherein the molar ratio of the ligand to the monofunctional initiator of formula (II) ranges from 0 to 50.

4. The process according to claim 1, wherein the compound RLi is reacted in a proportion of 0.7 to 2 equivalents in relation to the residual double bonds.

5. The process according to claim 1, wherein steps a), b) and c) are conducted at a temperature between 20° C. and 100° C.

6. The process according to claim 2, wherein steps a) and b) are performed in at least one nonpolar solvent selected from the group consisting of toluene, benzene, ethylbenzene and mixtures thereof.

7. A process for the preparation of a multifunctional anionic polymerization initiator which is in the form of a star-shaped polymer and which is soluble in a nonpolar medium, said initiator being denoted by formula (I):

$$(PA)_a N^{n-} nLi^+ \quad (I)$$

in which:

PA denotes a polymer block originating from at least one monomer A chosen from vinylaromatic or diene monomers;

a denotes the number of arms of the PA block and is between 3 and 15;

N denotes a crosslinked core substantially free of residual double bonds, which has formula:

$$(PMc)(RLi)_p$$

in which:

Mc is a monomer containing at least two polymerizable double bonds per molecule;

PMc is a core comprising a crosslinked polymerized monomer Mc, and containing 3 to 30% of residual double bonds in relation to the initial double bonds originating from the monomer Mc;

R is an alkyl radical with a linear or branched chain having 1 to 6 carbon atoms, an aryl radical with one or a number of ring(s), an arylalkyl or alkylaryl radical in which the alkyl group has from 1 to 6 carbon atoms, a cycloalkyl radical or a $C_2$-$C_6$ alkenyl radical substituted by an aryl or alkylaryl group; and p is the number of anionic sites resulting from the neutralization of the residual double bonds in PMc by RLi, and n is the number of anionic sites present in the crosslinked core N; n is equal to a'+p or to p, p having the above meaning and a' being the number of anionic sites present in the crosslinked PMc core and corresponding to the number a of arms of the PA block, said process comprising the steps of:

a) anionically polymerizing at least one monomer A in a nonpolar medium in the presence of an initiating system which comprises:

i) at least one monofunctional initiator of formula (II):

$$R^1-M \quad (II)$$

in which:

M denotes an alkali or alkaline-earth metal, and $R^1$ denotes an alkyl radical with a linear or branched chain having 1 to 6 carbon atoms, an aryl radical with one or a number of ring(s), an arylalkyl or alkylaryl radical in which the alkyl group has from 1 to 6 carbon atoms, a cycloalkyl radical or a $C_2$-$C_6$ alkenyl radical substituted by an aryl or alkylaryl group; and ii) optionally, at least one ligand selected from inorganic salts of alkali metals, nonnitrogenous macrocyclic complexing agents and organic compounds of alkali metals in which the alkali metal is associated with a group of formula $B(R^2)_4$ where $R^2$ is a hydrogen atom or an alkyl or aryl radical, to obtain a living polymer block $PA^-$;

b) reacting the living block $PA^-$ with at least one monomer Mc in a molar ratio of 2.5 to 15 per active center to obtain a star-shaped living polymer of formula (III):

$$(PA)_a(PMc)^{a-}aLi^+ \quad (III)$$

c) reacting the star-shaped polymer of formula (III) with a source of protons selected from the group consisting of an alcohol, water and a protonic acid to obtain a star-shaped precursor polymer in the deactivated state of formula (IV):

$$(PA)_a(PMc) \quad (IV)$$

and d) reacting the deactivated precursor polymer of formula (IV) with RLi as defined above to obtain a multifunctional initiator of formula (I).

8. The process according to claim 7, wherein the monofunctional initiator of formula (II) is sec-butyllithium, n-butyllithium and alpha-methylstyryllithium, 1,1-diphenylhexyllithium, diphenylmethyllithium or 1,1-diphenyl-3-methylpentyllithium.

9. The process according to claim 7, wherein the molar ratio of the ligand to the monofunctional initiator of formula (II) ranges from 0 to 50.

10. The process according to claim 7, wherein the compound RLi is reacted in a proportion of 0.7 to 2 equivalents in relation to the residual double bonds.

11. The process according to claim 7, wherein steps a), b), c) and d) are conducted at a temperature between 20° C. and 100° C.

12. The process according to claim 9, wherein steps a) and b) are performed in at least one nonpolar solvent selected from the group consisting of toluene, benzene, ethylbenzene and mixtures thereof.

* * * * *